United States Patent
Hymel et al.

(10) Patent No.: US 6,832,259 B2
(45) Date of Patent: Dec. 14, 2004

(54) DYNAMIC ADJUSTMENT OF TRANSMITTED DATA SIZE FOR A SUBSCRIBER DEVICE

(75) Inventors: James Allen Hymel, Lake Worth, FL (US); Rami Chaim Levy, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 133 days.

(21) Appl. No.: 10/230,719

(22) Filed: Aug. 29, 2002

(65) Prior Publication Data

US 2004/0044781 A1 Mar. 4, 2004

(51) Int. Cl.[7] .............................................. G06F 13/00
(52) U.S. Cl. ...................................................... 709/229
(58) Field of Search ................................ 345/700, 733, 345/734, 735, 736, 738; 709/200, 201, 202, 203, 217, 219, 230, 232, 235, 246, 247, 229; 365/226, 227; 320/106, 107, 112

(56) References Cited

U.S. PATENT DOCUMENTS 5,727,159 A * 3/1998 Kikinis ....................... 709/246
6,125,262 A    9/2000 Hymel ....................... 455/38.3

OTHER PUBLICATIONS

Jason Cook, "Phat Thin Client", Sep. 1998, Wired Magazine, p. 164.

* cited by examiner

Primary Examiner—Robert B. Harrell
(74) Attorney, Agent, or Firm—Posz & Bethards, PLC; Charles W. Bethards

(57) ABSTRACT

A service provider network (16) and method therein operates to dynamically reduce the bandwidth required for data. The service provider network (16) includes a memory (20) for storing subscriber information of a subscriber device (12), a data engine (22) for receiving a generic data request from the subscriber device (12), formatting the request into a compatible format, transmitting the request, and receiving data in response to the request, and an intelligent proxy server (18) for receiving the data from the data engine (22), manipulating or filtering the data as a function of the subscriber information to thin the content of the data, and outputting the filtered data to the subscriber device (12).

22 Claims, 1 Drawing Sheet

DYNAMIC ADJUSTMENT OF TRANSMITTED DATA SIZE FOR A SUBSCRIBER DEVICE

BACKGROUND OF THE INVENTION

1. Field of the Invention

The present invention relates to wireless communication, and specifically to wireless communications where data is dynamically filtered to reduce bandwidth required to send the data to a wireless subscriber device.

2. Description of Related Art

Emerging smart phone and smart messaging devices are generally capable of accessing the Internet through scaled down Internet browsers. Deployment of these emerging smart phone and smart messaging devices is seamless, as they are typically 2G or 2.5G devices that operate using conventional communications protocol such as CDMA or GSM and that subscribe to the service(s) of one or more service providers.

While the above new technology opens the way for advancements in wireless messaging, certain limitations do exist. Specifically, a service provider, while capable of storing a minimal device profile that is communicated by the device itself through a SIM card in a GSM device or through a device specific code in a CDMA device and that includes device identity and home region data for roaming purposes, has no way of determining a semi-static device profile (e.g., whether the device has a color display with graphics display capabilities) or a dynamically changing device status (e.g., device battery power level or available memory), and is not capable of receiving a user profile (e.g., device has color capabilities, but user requests text only for cost or bandwidth reasons).

As a result, the service provider will forward requested information such as, for example, color graphics to a requesting device regardless of whether, for example, the device battery power level is low or whether a subscriber using the device would prefer black and white graphics for bandwidth preservation and cost purposes. As the bandwidth available to each wireless device is limited (64 kB/sec for a 2G or 2.5G wireless device) and device battery life is finite, a device user may receive truncated data or may incur unexpected charges, or the device battery may run out of power during an Internet communications session.

Therefore, what is needed is a way to dynamically adjust, or filter, the information to be transmitted to a requesting wireless device.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

In overview form the present disclosure concerns communications systems that provide services and specifically data communications services to subscriber devices or units, such as cellular phones or two-way radios and the like, and users thereof operating therein. More particularly various inventive concepts and principles are discussed and disclosed that dynamically reduce the content or amount of data that is transported to the wireless devices based on various considerations.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, in the interest of brevity and minimization of any risk of obscuring the principles and concepts according to the present invention, further discussion of such software, if any, will be limited to the essentials with respect to the principles and concepts used by the preferred embodiments.

Figure 1:
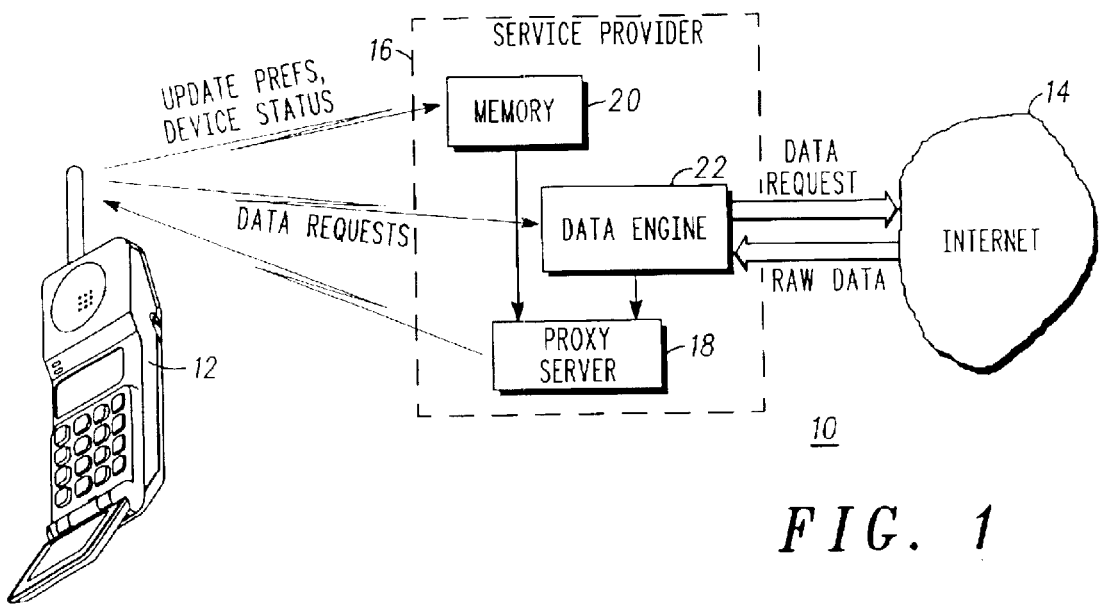
FIG. 1 is a block diagram of a wireless communications system in which an intelligent proxy server according to a preferred embodiment of the present invention is implemented.

Referring now to the drawings in which like numerals reference like parts, FIG. 1 shows a wireless communications system 10 including an exemplary subscriber device 12 and a remote data storage entity 14, as well as a service provider network 16 including an intelligent proxy server 18 according to a preferred embodiment of the present invention.

The subscriber device 12 may be any type of wireless phone or messaging device such as, for example, a CDMA or GSM type cellular telephone, that is capable of accessing the Internet, or any other remotely accessible information network, through a commercially available scaled down Internet browser and that subscribes to or has access to the wireless service(s) of one or more service providers.

The data storage entity 14 may be any remotely accessible entity, such as, for example, a search engine, a website or other Internet location, an Intranet location, any remote or local hard drive or storage medium or, more generically, any destination that contains data or provides access to data such as data accessible over the World Wide Web. Alternatively, the data storage entity 14 may be a service provider memory storage device if, for example, the service provider has an agreement with an Internet service provider to store World Wide Web accessible data locally to improve subscriber access time.

The service provider network 16 may be or include a central service provider location such as a mobile switching office (MSO), or any other location having access to subscriber information. In addition, the service provider network 16 represents a location from which the intelligent proxy server 18 may request the subscriber information, and where the subscriber information may be stored or updated. In addition to the intelligent proxy server 18, the service provider network 16 includes a memory 20 and a data engine 22. While it will be appreciated by one skilled in the art that a service provider network includes numerous additional hardware and software components, including base stations (not shown) for routing information from the subscriber device 12 to the memory 20 and the data engine 22, and from the intelligent proxy server 18 to the subscriber device 12, only those server components most relevant to the present invention are shown and will be discussed.

In addition to storing conventional subscriber information such as device identity and home region data, the memory 20 is for storing subscriber information such as, for example, a semi-static device profile, a dynamically changing device status, and a user profile. An exemplary semi-static device profile might contain data indicative of display type, memory size and text/audio/video capabilities. An exemplary dynamically changing device status might contain data indicative of a present device battery power level, present available memory, or current channel conditions such as bit or frame error rates. An exemplary user profile might contain user-defined parameters indicative of the device user's desire to receive only text data due to bandwidth and/or cost considerations, even though a device display has color graphics capability.

A user profile can also include parameters such as time of day user preferences so that, for example, a device user can receive only text data during the day and only text and graphics data at night when bandwidth availability and usage cost is less of a concern. In addition to time of day user preferences, user profile information may include other user defined parameters such as, for example, user preferences relating to day of week, roaming, user schedule and number of remaining free subscriber minutes. This above subscriber information is updated in the memory 20 either periodically when the memory 20 receives update preferences and device status information from the subscriber device 12, only when the subscriber device 12 transmits a data request, or at a predetermined threshold such as, for example, 10% free memory or 5% battery level.

The data engine 22 may be realized, for example, by software running on the intelligent proxy server 18 or by hardware that performs specific functions described below, and is programmed/configured for receiving generic data requests such as, for example, HTTP or WAP requests, from the subscriber device 12, formatting the requests into a format, such as HTTP or SCTP (Stream Control Transmission Protocol), suitable for transmission over the Internet, transmitting the requests to the data storage entity 14, and receiving requested data back from the data storage entity 14, rather than the requested data being sent directly back to the requesting subscriber device 12, as is the case with conventional subscriber devices. The data engine 22 is programmed to intermediately receive the requested data back from the data storage entity 14 so that it can input the requested data into the intelligent proxy server 18 for data filtering purposes.

It should be appreciated from the above discussion that the data engine 22 may be implemented in a myriad of different ways without deviating from the scope of the present invention. For example, in a WAP environment, a WAP proxy server that may already exist in WAP implemented hardware and software may transmit data to the data storage entity 14 and therefore effectively bypass the data engine 22 so that the data engine 22 is only operative to receive responses from the data storage entity 14 and pass the responses to the intelligent proxy server 18.

The intelligent proxy server 18 is a server that may be implemented through hardware, software, or both, for receiving the requested raw data from the data storage entity 14 through the data engine 22, and for manipulating, or, in other words, filtering, the raw data as a function of subscriber information such as the semi-static device profile, the dynamically changing device status, or the user profile retrieved from the memory 20 in response to device identity data in a data request received from the subscriber device 12. The intelligent proxy server 18 then passes the filtered data to a service provider transmitter (not shown) for transmission to the subscriber device 12.

The filtering performed by the intelligent proxy server 18 can be altered from the subscriber device 12 or locally in many different ways to, for example, thin audio files, truncate text files, increase the compression ratio of JPEG or MPEG files, or reduce graphic resolution, color depth or gray scale depth on image files. Several exemplary scenarios will be described to further illustrate the filtering that may be performed by the intelligent proxy filter 18.

In one exemplary scenario, the subscriber device 12 can monitor its battery power level and accordingly update its device profile (dynamic profile) in the memory 20, along with the level of filtering that should be associated with the battery power level. If the battery power level is between fully charged and 75% charged, the subscriber device 12 may instruct the intelligent proxy server 18 via the memory 20 not to institute any filtering. If the battery power level is between 75% charged and 50% charged, the subscriber device 12 may instruct the intelligent proxy server 18 via the memory 20 to convert all color pictures to 4-level gray scale. If the battery power level is between 50% charged and 25% charged, the subscriber device 12 may instruct the intelligent proxy server 18 via the memory 20 to convert all pictures to 2-level black and white. If the battery power level is below 25%, the subscriber device 12 may instruct the intelligent proxy server 18 via the memory 20 not to send picture data at all.

The wireless device 12 may also monitor its incoming signal strength, or bit error rate or have the service provider do so, and correspondingly update its device profile in the memory 20 as to the desired level of filtering. For example, if a bit error rate of the subscriber device 12 is in the range of 0%–2%, the subscriber device 12 may instruct the intelligent proxy server 18 via the memory 20 to not initiate data filtering. If the bit error rate of the subscriber device 12 is in the range of 2%–5%, the subscriber device 12 may instruct the intelligent proxy server 18 via the memory 20, for example, to convert all color pictures to 4-level gray scale. If the bit error rate of the subscriber device 12 is in the range of 5%–8%, the subscriber device 12 may instruct the intelligent proxy server 18 via the memory 20, for example, to convert all color pictures to 2-level black and white. If the bit error rate of the subscriber device 12 is above 8%, the subscriber device 12 may instruct the intelligent proxy server 18 via the memory 20, for example, to not transmit picture data, and instead to transmit a dummy thumbnail. Note that when the service provider is monitoring the bit error or frame error rates the above instructions may be standing instructions.

Alternatively, a user of the wireless device 12 may simply select a level of filtering based on a cost threshold, usually in cost per unit of transmitted information or per unit of time required for transmission, associated with a particular type of messaging service. For example, the subscriber device 12 may instruct the intelligent proxy server 18 via the memory 20, for example, to reduce the resolution or color depth of pictures, or in other words convert all pictures to one of full color (256-bit), which is the most expensive type of service, 4-level gray scale, 2-level black and white, or to the dummy thumbnail, which is the least expensive type of service.

In addition to any of the above types of filtering scenarios, a user of the subscriber device 12 may also update one of the device profile, the user profile, or the device status stored in the memory 20 to stipulate that, for example, audio files be thinned to reduce the content transmitted from the data engine 22 to the subscriber device 12. The intelligent proxy server 18 would subsequently filter audio files by evenly dropping bits from the audio file by a desired percentage to reduce the richness of the audio file and therefore expedite the transfer of audio data to the subscriber device 12. Similarly, a user of the subscriber device 12 may also update one of the device profile, the user profile, or the device status to stipulate that, for example, text files be filtered so that only a summary portion be sent to the subscriber device 12, only a summary portion and general information be sent to the subscriber device 12, or that a summary portion, general information and detailed text information be sent to the subscriber device 12.

Figure 2:
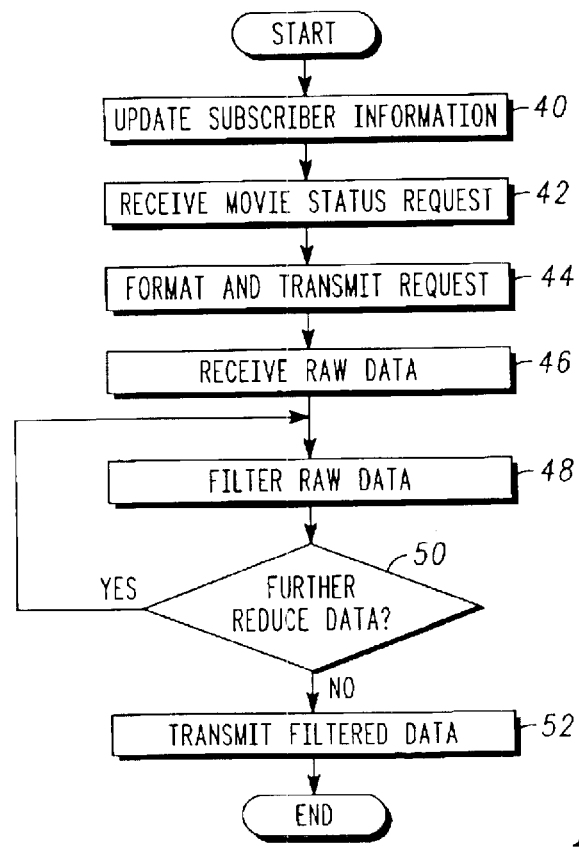
FIG. 2 is a flow diagram illustrating the exemplary operation of a service provider network, including the intelligent proxy server of FIG. 1, to dynamically adjust the content of information to be transmitted to a requesting wireless device.

Referring now to FIG. 2, operation of the service provider network 16, including the intelligent proxy server 18, will now be described within the context of an exemplary scenario in which the subscriber device 12 requests data from the data storage entity 14.

When a user of the subscriber device 12 requests, for example, the status of all movies playing within a local area, the subscriber device 12 transmits the local movie request as well as subscriber information including device location, battery status (for example, 50% charged), and a detected signal strength, or bit error rate (BER), to the memory 20. Subsequently at 40, the memory 20 updates the subscriber information associated with the specific subscriber device 12 and stored therein. At 42, the data engine 22 receives the local movie request, and at 44 formats the request into an Internet readable format and transmits the request to the data storage entity 14. In response, at 46, the data engine 22 receives raw local movie data back from the data storage entity 14. This raw local movie data may include, for example, lists of local movie theaters, movies, movie times, movie reviews, and links to video trailers. In the present example, the total amount of raw local movie data received is 10 kB.

At 48, the intelligent proxy server 18 receives the raw local movie data from the data engine 22, identifies the subscriber device 12 through the device identity data transmitted with the raw local movie data, and uses the stored subscriber information to filter the raw local movie data. For example, the intelligent proxy server 18 reduces all graphics data to 256-level gray, de-animates GIFs, and recalculates the size of the remaining raw local movie data to be 7 kB. If it is determined at 50 that the data must be further reduced in size based on the user preferences, device profiles and/or device status, at 48 the intelligent proxy server 18 then removes all HTML formatting information from the remaining data to reduce the data size to 6 kB. If it is determined again at 50 that the data must be further reduced in size based on the user preferences, device profiles and/or device status, at 48 the intelligent proxy server 18 further reduces movie review text lengths to 200 characters each to reduce the remaining data size to 5 kB. If at 50 it is finally determined that the data has been sufficiently reduced in size, at 52 the intelligent proxy server 18 relays the 5 kB of data to the subscriber device 12 via a service provider transmitter (not shown) for review by the user, and the filtering process ends.

In view of the above, one skilled in the art will appreciate that the intelligent proxy server 18 is capable of filtering data based on subscriber information such as, for example, a device profile, a user profile, or a device status stored in the memory 20 at, for example, a service provider MSO. The intelligent proxy server 18 thereby enables a subscriber device user to control the amount and type of data received in response to a data request by taking variables such as device battery usage, bandwidth and cost into consideration.

While the above description is of the preferred embodiment of the present invention, it should be appreciated that the invention may be modified, altered, or varied without deviating from the scope and fair meaning of the following claims.

For example, the subscriber device 12 could be configured to perform data filtering to eliminate the need for implementation of the intelligent proxy server 18 at, for example, a service provider mobile switching office, in exchange for the amount of data being transmitted to the subscriber device 12 not being reduced.

In addition, the service provider network 16 could be configured so that the intelligent proxy server 18 uses an external proxy service to initially filter received data prior to the intelligent proxy server 18 performing final filtering. For example, if the intelligent proxy server 18 is not capable of removing tables or de-animating GIFs, or it is not capable of further compressing video data due to proprietary compression technology, it may send the data to an external proxy service to, for example, further compress MPEG2 formatted data to MPEG4 formatted data or to deanimate GIFs. Alternatively, the intelligent proxy server 18 itself may be remotely located from the co-located memory 20 and data engine 22.

Further, if the entity represented by the service provider network 16 is, for example, an MSO, the MSO may be programmed to periodically retrieve the subscriber device profiles and statuses independent of subscriber device status requests.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations, such as described just above and others, are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of controlling an amount of requested data being transmitted to a requesting subscriber device, comprising:

receiving the requested data;

identifying the subscriber device based on the receiving of the requested data;

retrieving stored subscriber information indicative of a semi-static device profile and at least one of a dynamically changing device status and a user profile associated with the subscriber device in response to the identifying of the subscriber device;

filtering the requested data as a function of at least one of the periodically updated semi-static device profile, the dynamically changing device status, and the user profile associated with the subscriber device; and transmitting filtered data resulting from the filtering of the requested data to the subscriber device.

2. The method of claim 1, wherein the filtering of the requested data comprises reducing content of the requested data based on a selected user cost threshold.

3. The method of claim 2, wherein the selected user cost threshold is a function of user defined parameters.

4. The method of claim 3, wherein the user defined parameters comprise at least one of time of day, day of week, roaming, user schedule and number of remaining free subscriber minutes.

5. The method of claim 2, wherein the reducing of content of the requested data based on a selected user cost threshold comprises at least one of thinning audio files, truncating text files, increasing a compression ratio of JPEG or MPEG files, and reducing graphic resolution, color depth or gray scale depth on image files.

6. The method of claim 1, wherein the filtering of the requested data comprises reducing content of the requested data based on a subscriber device battery level.

7. The method of claim 6, wherein the reducing of content of the requested data based on a subscriber device battery level comprises at least one of thinning audio files, truncating text files, increasing a compression ratio of JPEG or MPEG files, and reducing graphic resolution, color depth or gray scale depth on image files.

8. The method of claim 1, wherein the filtering of the requested data comprises reducing content of the requested data based on a subscriber device bit error rate.

9. The method of claim 8, wherein the reducing of content of the requested data based on a subscriber device bit error rate comprises at least one of thinning audio files, truncating text files, increasing a compression ratio of JPEG or MPEG files, and reducing graphic resolution, color depth or gray scale depth on image files.

10. The method of claim 1, wherein the receiving of the requested data comprises receiving requested Internet data.

11. A service provider system, comprising:

a memory for storing subscriber information of a subscriber device including a semi-static device profile and at least one of dynamically changing device status and a user profile;

a data engine for receiving a generic data request from the subscriber device, formatting the request into a format compatible with a type of data being requested, transmitting the request, and receiving data in response to the generic data request; and an intelligent proxy server in communication with both the memory and the data engine for manipulating data received by the data engine as a function of the subscriber information received from the memory, and for outputting manipulated data to the subscriber device.

12. The service provider system of claim 11, wherrein the intelligent proxy server is for filtering the data to reduce content of the data.

13. The service provider system of claim 12, wherein the intelligent proxy server is for filtering the data to reduce content of the data based on at least one of a subscriber device battery level, a subscriber device bit error rate, and a selected user cost threshold.

14. The service provider system of claim 13, wherein the selected user cost threshold is a function of user defined parameters.

15. The service provider system of claim 14, wherein the user defined parameters comprise at least one of time of day, day of week, roaming, user schedule and number of remaining free subscriber minutes.

16. The service provider system of claim 12, wherein the intelligent proxy server is for filtering the data to reduce content of the data by at least one of thinning audio files, truncating text files, increasing a compression ratio of JPEG or MPEG files, and reducing graphic resolution, color depth or gray scale depth on image files.

17. The service provider system of claim 11, wherein the memory is further for receiving from the subscriber device updates of at least one of the semi-static device profile, the dynamically changing device status, and the user profile.

18. The service provider system of claim 11, wherein the data engine is for receiving a generic Internet data request.

19. The service provider system of claim 11, wherein the memory and the data engine are co-located and the proxy server is located remotely from the memory and the data engine.

20. A method of processing a data request from a wireless subscriber device, comprising:

storing subscriber information of a subscriber device including a semi-static device profile and at least one of a dynamically changing device status, and a user profile;

receiving a generic data request from the subscriber device, formatting the request into a format compatible with a type of data being requested;

transmitting the generic data request to a data storage sector;

receiving data in response to the transmitting of the request to a data storage sector; and manipulating the data as a function of the subscriber information to reduce content of the data.

21. The method of claim 20, wherein the manipulating of the data as a function of the subscriber information to reduce content of the data comprises filtering the data to reduce the content of the data based on at least one of subscriber device battery level, subscriber device bit error rate, and selected user cost threshold.

22. The method of claim 21, wherein the filtering of the data to reduce the content of the data based on at least one of the subscriber device battery level, the subscriber device bit error rate, and the selected user cost threshold further comprises filtering the data to reduce the content of the data by at least one of thinning audio files, truncating text files, increasing a compression ratio of JPEG or MPEG files, and reducing graphic resolution, color depth or gray scale depth on image files.

* * * * *